United States Patent
Lim et al.

(10) Patent No.: US 9,223,689 B2
(45) Date of Patent: Dec. 29, 2015

(54) APPARATUS AND METHOD FOR MANAGING MEMORY

(75) Inventors: Geun-Sik Lim, Hwaseong-si (KR); Sang-Bum Suh, Seoul (KR); Ju-Pyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 13/107,551

(22) Filed: May 13, 2011

(65) Prior Publication Data

US 2011/0283080 A1 Nov. 17, 2011

(30) Foreign Application Priority Data

May 14, 2010 (KR) .................. 10-2010-0045589

(51) Int. Cl.
*G06F 12/02* (2006.01)
(52) U.S. Cl.
CPC .................................. *G06F 12/023* (2013.01)
(58) Field of Classification Search
CPC .............................. G06F 12/02; G06F 12/023
USPC .......................................................... 711/170
See application file for complete search history.

(56) References Cited

U.S. PATENT DOCUMENTS

| | | | | |
|---|---|---|---|---|
| 6,658,652 | B1 * | 12/2003 | Alexander et al. | 717/128 |
| 7,584,206 | B2 * | 9/2009 | Fukuoka et al. | 1/1 |
| 7,734,864 | B2 * | 6/2010 | Maeda et al. | 711/103 |
| 8,099,577 | B2 * | 1/2012 | Baddepudi et al. | 711/173 |
| 2008/0046489 | A1 | 2/2008 | Defrance et al. | |
| 2009/0113162 | A1 | 4/2009 | Di-Zenzo | |
| 2009/0193212 | A1 * | 7/2009 | Kodaka | 711/163 |
| 2010/0030994 | A1 | 2/2010 | Guzman | |
| 2010/0229175 | A1 * | 9/2010 | Gonzalez et al. | 718/104 |
| 2010/0312984 | A1 * | 12/2010 | Robin et al. | 711/171 |

FOREIGN PATENT DOCUMENTS

| | | |
|---|---|---|
| JP | 05-108462 A | 4/1993 |
| JP | 2001-154860 A | 6/2001 |
| KR | 10-2000-0002901 | 1/2000 |
| KR | 10-2002-0056970 | 7/2002 |
| KR | 10-2003-0071299 A | 9/2003 |
| KR | 10-2006-0063705 | 6/2006 |
| KR | 10-2007-0074916 | 7/2007 |
| KR | 10-2007-0092715 | 9/2007 |
| WO | WO 2007/097581 A1 | 8/2007 |
| WO | WO 2009/098547 A1 | 8/2009 |

OTHER PUBLICATIONS

Extended European Search Report (including European Search Opinion) issued on Oct. 10, 2011, in counterpart European Patent Application No. 11165602.1 (7 pages, in English).
Korean Office Action mailed on Mar. 28, 2014 in counterpart Korean Application No. 10-2010-0045589 (6 pages, including an English translation).
Japanese Office Action mailed on Mar. 10, 2015 in counterpart Japanese Application No. 2011-104862 (5 pages, in Japanese, including an English translation).

* cited by examiner

*Primary Examiner* — Aimee Li
*Assistant Examiner* — Trang Ta
(74) *Attorney, Agent, or Firm* — NSIP Law

(57) ABSTRACT

Provided is a memory management method, and an apparatus to perform the method, which achieves a shortened user waiting time in consideration of system performance. The method includes acquiring a deallocation unit used to deallocate an allocated memory area according to at least one attribute, and deallocating the allocated memory area using the deallocation unit.

24 Claims, 6 Drawing Sheets ns of Korean Patent Application
APPARATUS AND METHOD FOR MANAGING MEMORY

CROSS-REFERENCE TO RELATED APPLICATION

This application claims the benefit under 35 U.S.C. §119(a) of Korean Patent Application No. 10-2010-0045589, filed on May 14, 2010, in the Korean Intellectual Property Office, the entire disclosure of which is incorporated herein by reference for all purposes.

BACKGROUND

1. Field

The following description relates to a memory management technique for allocating and/or deallocating memory.

2. Description of the Related Art

Memory allocation refers to reserving a predetermined area of a memory to allow a certain process or device to use that predetermined memory area. Memory deallocation refers to releasing the occupied state of a memory area allocated to a certain process or device and returning that memory area to its original or previous state.

In the case of a system that processes extremely large quantities of files, such as a digital camera or digital camcorder which records and plays video data, there is a waiting time experienced by a user due to a conversion period that generally follows a transition between modes, such as the transition from recording mode to play mode.

This user waiting time is caused by memory deallocation that occurs during mode conversion. More specifically, in a situation in which memory deallocation occurs, a user waiting time is lengthened due to unnecessarily high CPU usage.

In general, memory deallocation is performed many times in order to deallocate an allocated memory area repeatedly in units of a memory size corresponding to a fixed value.

SUMMARY

In one general aspect, there is provided a memory management apparatus including a memory allocator configured to allocate a memory, a deallocation calculator configured to acquire a deallocation unit for deallocating the allocated memory, in consideration of performance of a corresponding system, and a memory deallocator configured to deallocate the allocated memory based on the deallocation unit.

The memory allocator may allocate a predetermined area of the memory to a process on the system, in response to a first mode of the system being selected.

The system may include a digital camera and/or a mobile device including a digital camera, and the first mode may be a play mode for playing data stored in the system.

The memory deallocator may deallocate a predetermined area of the memory allocated to a process on the system in units of the acquired deallocation unit, in response to a second mode of the system being selected, in order to return the deallocated predetermined area of the memory to a previous state.

The system may include a digital camera and/or a mobile device comprising a digital camera, and the second mode may be a recording mode for recording data in the system.

The deallocation calculator may acquire an optimal number of deallocation operations based on user waiting times measured for various numbers of deallocation operations for deallocating the allocated memory in accordance to the performance of the system, and may acquire the deallocation unit by dividing a size of the allocated memory by the optimal number of deallocation operations.

The deallocation unit may be defined as a basic unit for a deallocation operation for deallocating the allocated memory, and may include at least one page.

In another general aspect, there is provided a memory management method including allocating a memory, acquiring a deallocation unit for deallocating the allocated memory according to performance of a corresponding system, and deallocating the allocated memory based on the deallocation unit.

The allocating of the memory may include allocating a predetermined area of the memory to a process on the system, in response to a first mode of the system being selected.

The acquiring of the deallocation unit may include measuring user waiting times for various numbers of deallocation operations for deallocating the allocated memory, according to the performance of the system, acquiring an optimal number of deallocation operations, based on the measured user waiting times, and acquiring the deallocation unit by dividing a size of the allocated memory by the optimal number of deallocation operations.

The deallocating of the allocated memory may include deallocating a predetermined area of the memory allocated to a process on the system in units of the acquired deallocation unit, in response to a second mode of the system being selected, in order to return the deallocated predetermined area of the memory to a previous state.

In another general aspect, there is provided an electronic device including a memory, and a memory manager configured to manage allocation and deallocation of the memory, wherein the memory manager acquires a deallocation unit of the memory in consideration of a performance of a corresponding system, and deallocates an allocated memory area based on the acquired deallocation unit.

The electronic device may be a digital camera or a mobile device including a digital camera.

The memory manager may allocate a predetermined area of the memory to a process on the electronic device, in response to a play mode for playing data recorded in the electronic device being selected, and may deallocate the allocated predetermined area of the memory based on the deallocation unit, in response to a recording mode for recording data in the electronic device being selected.

The memory manager may acquire an optimal number of deallocation operations, based on user waiting times measured for various numbers of deallocation operations for deallocating the allocated memory and which depend upon a CPU performance of the electronic device, and may acquire the deallocation unit by dividing a size of the allocated memory area by the optimal number of deallocation operations.

In another general aspect, there is provided a method of managing memory, the method including acquiring a deallocation unit used to deallocate an allocated memory area according to at least one attribute, and deallocating the allocated memory area using the deallocation unit.

The at least one attribute may include performance of a system corresponding to the is memory.

The at least one attribute may include a user waiting time incurred upon changing system modes.

The method may further include measuring deallocation times according to various numbers of deallocation units used to deallocate the memory area, in order to acquire an optimal number of deallocation units.

The method may further include measuring various sizes of deallocation units in order to acquire an optimal number of deallocation units.

In another general aspect, there is provided an electronic device including a memory manager to acquire a deallocation unit used to deallocate an allocated memory area according to at least one attribute, wherein the memory manager deallocates the allocated memory area using the deallocation unit.

The at least one attribute may include performance of the electronic device or a system corresponding to the electronic device.

The at least one attribute may include a user waiting time incurred upon changing modes of the electronic device.

The memory manager may measure deallocation times according to various numbers of deallocation units used to deallocate the memory area, in order to acquire an optimal number of deallocation units.

The memory manager may measure various sizes of deallocation units in order to acquire an optimal number of deallocation units.

Other features and aspects will be apparent from the following detailed description, the drawings, and the claims.

Figure 1:
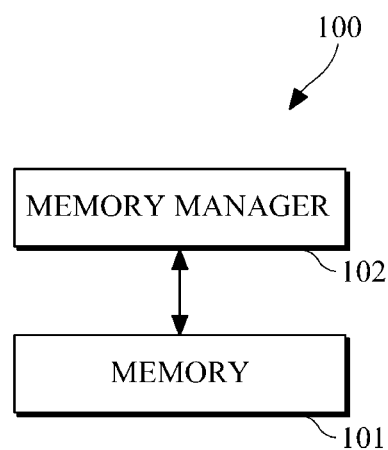
FIG. 1 is a diagram illustrating an example of an electronic device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of an electronic device 100.

Referring to FIG. 1, the electronic device 100 may be part of, for example, a digital camera (or a digital camcorder), or a mobile device (for example, a smart phone, PMP, PDA, or the like) in which a digital camera (or a digital camcorder) is installed.

The electronic device 100 may include a memory 101 and a memory manager 102. The memory 101 may store and maintain an OS, application programs, and/or any available data. The memory manager 102 allocates a specific area of the memory 101 to a certain process of the electronic device 100 and/or deallocates a specific area of memory 101, which had been allocated to a previous process, in order to return the deallocated area of memory 101 back to the electronic device 100 to be used immediately and/or be available for a future allocation. In the current example, memory allocation refers to reserving a predetermined area of memory so that a certain process and/or device may use that predetermined memory area. Memory deallocation, in turn, refers to releasing the occupied state of a memory area allocated to a certain process and/or device, and returning that memory area to its original or previous state in which it is available to be used immediately and/or be available for a future allocation.

For example, in a case in which the electronic device 100 is a digital camcorder, the memory manager 102 may allocate a predetermined area of memory 101 to a process related to playing video data, in response to a user choosing a play mode for playing stored video data. The memory manager 102 may also deallocate that predetermined area of memory 101 allocated to the play mode in response to a user choosing a recording mode necessary for writing or recording new video data.

Memory deallocation by the memory manager 102 may be performed based on a predetermined deallocation unit. A deallocation unit is a basic unit for memory deallocation, such as a certain number of pages of the memory 101. The deallocation unit may be several pages long and chosen in consideration of an operating characteristic such as the CPU performance and/or user waiting time of the electronic device 100. One such operating characteristic, the aforementioned user waiting time, refers to a length of time a user spends waiting for a chosen mode, such as a recording mode, to begin after the deallocation of the predetermined area of the memory 101 so that the area may be used in the recording mode.

In a conventional system, the deallocation unit may have a fixed value regardless of the system's performance. However, according to the current example, the electronic device 100 may appropriately acquire a deallocation unit according to the system's performance, and perform memory deallocation based on the deallocation unit, which reduces the user waiting time. The electronic device may acquire the deallocation unit by performing the necessary calculations within a unit of the electronic device 100, or may acquire the deallocation unit from another device or process outside the electronic device 100 which has performed any necessary computations or references related to the corresponding system in which the electronic device 100 is included.

For example, in a case in which the electronic device 100 is a digital camcorder, memory deallocation, which may be performed upon conversion from a play mode to a recording mode, is performed in units of a deallocation unit that has been acquired according to the system's performance and/or a user's waiting time, reducing the user waiting time upon mode conversion.

Figure 2:
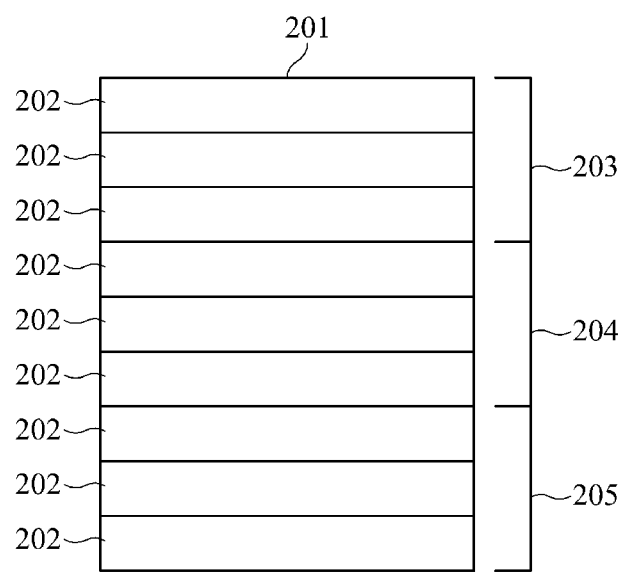
FIG. 2 illustrates an example of a memory deallocation operation.

FIG. 2 illustrates an example of a memory deallocation operation.

In the example illustrated in FIG. 2, an allocation memory area 201 is composed of 9 pages (each labeled as 202). A deallocation unit, which is the basic unit for memory deallocation, is composed of 3 pages 202. However, it is noted that this configuration merely pertains to this example, which is simplified for clarity. The allocated memory area 201 of an actual system could realistically be composed of hundreds or thousands of pages 202, and a deallocation unit of such a system may be composed of tens or hundreds or thousands, and so on, of those pages 202.

According to the current example, memory deallocation in terms of the acquired deallocation unit is performed several times in order to deallocate the memory. First, an area 203, corresponding to the deallocation unit, is deallocated. After the first area 203 is deallocated, a second area 204, corresponding to the deallocation unit, is also deallocated. After the second area 204 is deallocated, a third area 205, corresponding to the deallocation unit, is deallocated. The number of times of which such memory deallocation operations are performed is referred to as the number of deallocation operations. In the example of FIG. 2, the number of deallocation operations is 3, which refers to the first area 203, second area 204, and third area 205 which are deallocated in the entirety of the deallocation process.

The number of deallocation operations is closely associated with the user waiting time. For example, the user waiting time may be shortened or lengthened depending on the number of memory deallocation operations that are performed upon a mode conversion between the play mode and recording mode of a digital camcorder or other such electronic device. In other words, there may be an optimal number of deallocation operations by which the shortest user waiting time is achieved.

Figure 3:
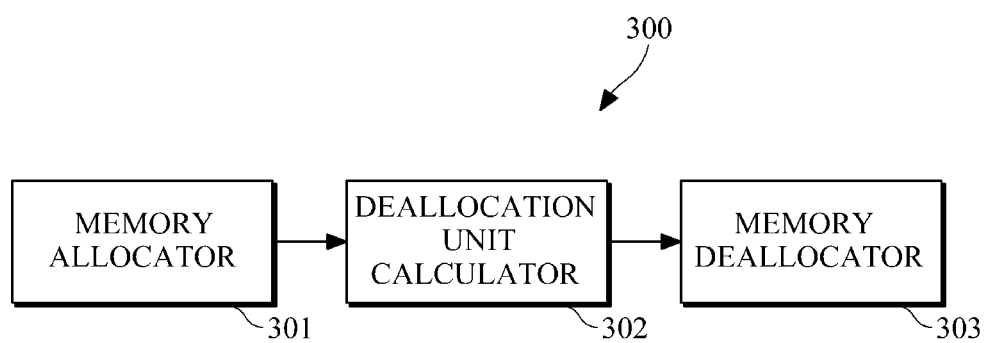
FIG. 3 is a diagram illustrating an example of a memory management apparatus.

FIG. 3 is a diagram illustrating an example of a memory management apparatus 300. The memory management apparatus 300 illustrated in FIG. 3 may be an example of the memory manager 102 illustrated in FIG. 1.

Referring to FIGS. 1 and 3, the example memory management apparatus 300 includes a memory allocator 301, a deallocation unit calculator 302, and a memory deallocator 303.

The memory allocator 301 allocates a predetermined area of memory 101 to a process on the corresponding system as a response to the first mode of the system being engaged. In a case in which the system is a digital camcorder, the memory allocator 301 may perform memory allocation, for example, according to a play mode for playing or displaying stored video data.

The memory deallocator 303 deallocates a predetermined area of memory 101 assigned to a process on the system to return the deallocated area of memory 101 back to the system. In a case in which the system is a digital camcorder, the memory deallocator 303 may perform memory deallocation, for example, according to a recording mode for writing or recording video data.

An mmap( ) system call and a munmap( ) system call may be used for memory allocation and memory deallocation. The mmap( ) system call sets a memory area that can be read or recorded by two or more programs. The mmap( ) system call has been initially introduced for mapping to a process space, but can also be used for allocating a memory area. Designating an off-parameter when using a mmap( ) system call can change a start point of file data that is accessed by a shared segment. An addr parameter is used to request a specific memory address. The munmap( ) system call allows deallocation of a process space area allocated by a mmap( ) system call.

In association with memory deallocation, the deallocation unit calculator 302 determines a deallocation unit, which is the basic unit used for a deallocation operation, in consideration of the system's performance. For example, the deallocation unit calculator 302 may calculate a deallocation unit in consideration of the CPU performance or CPU operating speed of the system, using Equation 1 below.

$$\text{Deallocation Unit} = \text{Size of Allocated Memory}/\text{Optimal Number of Deallocation Operations} \quad (1)$$

The method of calculating a deallocation unit using Equation 1 will be described below.

After a memory area is allocated, a user waiting time in which memory allocation operations are performed by a predetermined number of deallocation operations on the allocated memory area is measured. The user waiting time may depend on the performance of a CPU. User waiting times are then measured while increasing or decreasing the number of deallocation operations, and the number of deallocation operations at which the shortest user waiting time is achieved is selected as the optimal number of deallocation operations. Afterwards, a deallocation unit is calculated using the optimal number of deallocation operations and the size of the allocated memory area.

For example, an allocation of 100 MB of memory area may have a predetermined number of 25 deallocation operations. In this case, the deallocation unit calculator 302 may measure the user waiting times for various numbers of deallocation operations that are within a specific range above and/or below the predetermined number of deallocation operations in order to acquire the optimal number of deallocation operations. For example, the deallocation unit calculator 302 may measure the user waiting times for different numbers of deallocation operations above and below the predetermined number of 25, such as, for example, 23, 24, 26, and 27. If the shortest user waiting time is 26 deallocation operations, the deallocation unit calculator 302 selects "26" as the optimal number of deallocation operations. After an optimal number of deallocation operations is obtained, a deallocation unit may be acquired by dividing the size of the allocated memory area by the optimal number of deallocation operations according to Equation 1.

If a memory area of 300 MB is allocated, a user response time may again be measured to select an optimal number of deallocation operations. In this case, a different number of deallocation operations may be selected. For example, when an optimal number of deallocation operations is determined to be 30, deallocation is performed in units of a deallocation unit of 10 (=300 MB/30 Times).

Figure 4:
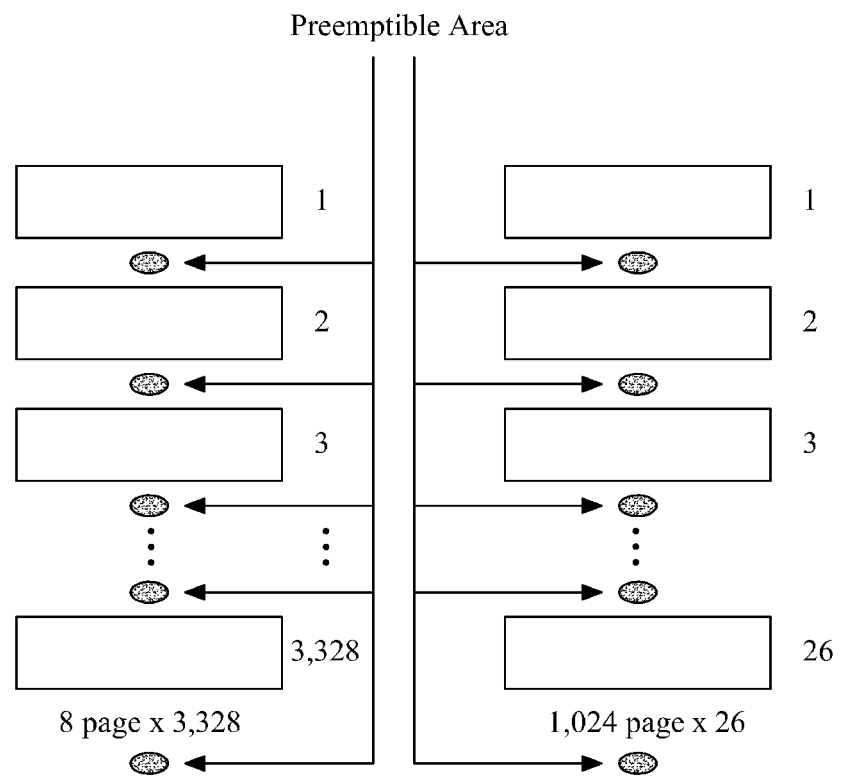
FIG. 4 illustrates examples of a fixed deallocation unit and a variable deallocation unit.

FIG. 4 illustrates a fixed deallocation unit and a variable deallocation unit.

Referring to FIG. 4, there is a difference, which will be described, between a case in which the deallocation unit is fixed regardless of the system's CPU performance, such as in a conventional system, and a case in which the deallocation unit is adjusted depending on the system's CPU performance, such as in some of the examples described herein. For example, in order to deallocate an allocated memory area of 100 MB using a fixed deallocation unit of 8 pages, as in the conventional system illustrated on the first side of FIG. 4, deallocation operations have to be performed 3,328 times in those units of 8 pages. However, in an example in which a variable deallocation unit is used to deallocate an allocated memory area of 100 MB, as in the example illustrated on the second side of FIG. 4, a deallocation unit that can obtain the shortest user response speed in consideration of the CPU's performance may be calculated as 1,024 pages, so that deallocation operations are performed 26 times in units of 1,024 pages. In other words, the case in which 100 MB is deallocated through 3,328 deallocation operations in units of 8 pages versus the case where 100 MB is deallocated through 26 deallocation operations in units of 1,024 pages—depending on the kind of system or CPU performance—may result in very different user waiting times. Therefore, by setting a deallocation unit capable of achieving the shortest user waiting time and performing a deallocation operation according to that deallocation unit, the user waiting time due to memory deallocation may be reduced.

Figure 5:
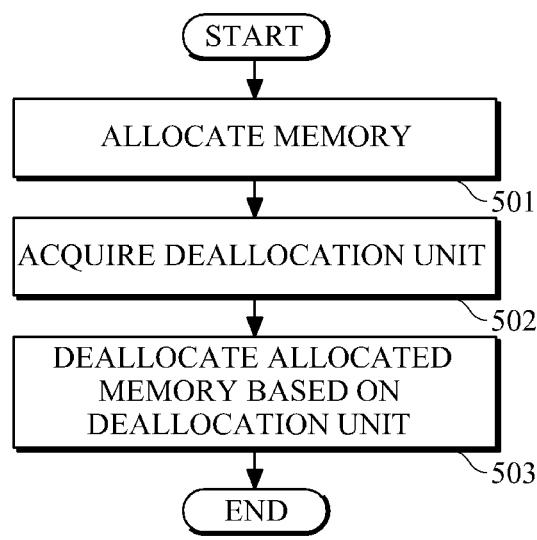
FIG. 5 is a flowchart illustrating an example of a memory management method.

FIG. 5 is a flowchart illustrating an example of a memory management method.

The memory management method will be described with reference to FIGS. 1, 3 and 5, below.

In operation 501, a memory 101 is allocated. For example, in a case in which the electronic device 100 is a digital camcorder, the memory allocator 301 may allocate a predetermined area of the memory 101 in response to a user selecting a play mode for playing stored video data.

In response to a mode calling for the memory 101 to be deallocated, such as the user selecting a recording mode after the play mode, a deallocation unit is acquired in consideration of the performance of the corresponding system and/or the user waiting time in operation 502. The deallocation unit calculator 302 may calculate the deallocation unit using Equation 1.

After the deallocation unit is acquired, the memory 101 is deallocated based on the acquired deallocation unit in operation 503. For example, the memory deallocator 303 may deallocate the predetermined area of memory 101 allocated in the play mode, in response to the user selecting a recording mode for recording video data.

Figure 6:
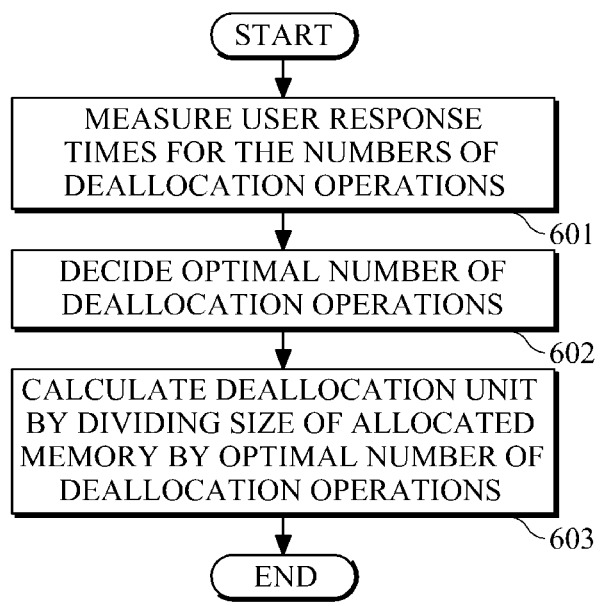
FIG. 6 is a flowchart illustrating an example of a method of acquiring a deallocation unit.

FIG. 6 is a flowchart illustrating an example of a method of acquiring a deallocation unit.

Referring to FIGS. 3 and 6, in order to acquire a deallocation unit, in operation 601 a user waiting time is measured for different numbers of deallocation operations (601). For example, the deallocation calculator 302 may measure the user waiting times for a number of deallocation operations that are within a specific range above and below a predetermined number of deallocation operations.

An optimal number for deallocation operations is then acquired in operation 602. For example, the deallocation unit calculator 302 will select a number of deallocation operations corresponding to the shortest user waiting time, among the measured user waiting times, as the optimal number of deallocation operations.

A deallocation unit is calculated by dividing the size of an allocated memory area by the optimal number of deallocation operations in operation 603. For example, the deallocation unit calculator 302 may calculate a deallocation unit according to Equation 1.

Meanwhile, the memory management apparatus and method may be implemented as a part of an OS of a certain system. As an example, the OS may operate only in response to a is system call being called from an application program or in response to an interrupt being generated from the hardware. For example, according to the current example, in a case in which an OS calls library functions mmap and munmap for memory allocation and deallocation, an application program calls a library function mmap that exists in a library. The library function mmap calls a mmap system call. The mmap system call executes a corresponding instruction depending on architecture and forcibly generates an interrupt, thereby calling a specific function of the OS. The OS then starts to process the mmap system call. The mmap system call is executed in a virtual Filesystem function. The Filesystem recognizes which block of which device data of a target file is disposed in, and requests a block device driver capable of controlling the device to read the data. The block device driver controls the hardware in response to the read request. The hardware transmits data on the device block to a cache area in the OS according to an I/O request. In response to the transmission being complete, the transmission completion is notified in the form of a hardware interrupt to the OS. The Filesystem copies data in a buffer that is managed by the library function mmap from the cache area in the OS, completing the process of the mmap system call.

The examples described above may be implemented as computer-readable codes in a computer-readable storage media. The computer-readable storage media includes all kinds of recording devices in which data that is readable by a computer system is stored.

Examples of a computer readable medium include magnetic storage media (for example, ROM, floppy disks, hard disks, among others), random-access memory (RAM), optical recording media for example, CD-ROMs, or DVDs), and other such storage media. The computer readable medium can also be distributed over network-coupled computer systems so that the computer readable code/instructions/programs can be stored and executed in a distributed fashion. Further, functional programs, codes, and code segments for implementing this disclosure can be easily construed by programmers of ordinary skill in the art to which this disclosure pertains.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory management apparatus comprising:
 a memory allocator configured to allocate a memory;
 a deallocation calculator configured to acquire a deallocation unit for deallocating the allocated memory based on an optimal number of deallocation operations and in consideration of performance of a corresponding system; and
 a memory deallocator configured to deallocate the allocated memory based on the deallocation unit,
 wherein the deallocation calculator is configured to acquire the optimal number of deallocation operations based on measured user waiting times measured for various numbers of deallocation operations for deallocating the allocated memory in accordance to the performance of the system, and is configured to acquire the deallocation unit by dividing a size of the allocated memory by the optimal number of deallocation operations.

2. The memory management apparatus of claim 1, wherein the memory allocator allocates a predetermined area of the memory to a process on the system, in response to a first mode of the system being selected.

3. The memory management apparatus of claim 2, wherein the system includes a digital camera or a mobile device comprising a digital camera, and the first mode is a play mode for playing data stored in the system.

4. The memory management apparatus of claim 1, wherein the memory deallocator deallocates a predetermined area of the memory allocated to a process on the system in units of the acquired deallocation unit, in response to a second mode of the system being selected, in order to return the deallocated predetermined area of the memory to a previous state.

5. The memory management apparatus of claim 4, wherein the system includes a digital camera or a mobile device comprising a digital camera, and the second mode is a recording mode for recording data in the system.

6. The memory management apparatus of claim 1, wherein the deallocation unit is defined as a basic unit for a deallocation operation for deallocating the allocated memory, and includes at least one page.

7. A memory management method comprising:
 allocating a memory;
 determining an optimal number of deallocation operations based on measured user waiting times for various numbers of deallocation operations;

acquiring a deallocation unit for deallocating the allocated memory based on the optimal number of deallocation operations and according to performance of a corresponding system; and deallocating the allocated memory based on the deallocation unit.

8. The memory management method of claim 7, wherein the allocating of the memory comprises allocating a predetermined area of the memory to a process on the system, in response to a first mode of the system being selected.

9. The memory management method of claim 7, wherein the acquiring of the deallocation unit comprises:
measuring user waiting times for various numbers of deallocation operations for deallocating the allocated memory, according to the performance of the system;
acquiring the optimal number of deallocation operations, based on the measured user waiting times; and
acquiring the deallocation unit by dividing a size of the allocated memory by the optimal number of deallocation operations.

10. The memory management method of claim 7, wherein the deallocating of the allocated memory comprises deallocating a predetermined area of the memory allocated to a process on the system in units of the acquired deallocation unit, in response to a second mode of the system being selected, in order to return the deallocated predetermined area of the memory to a previous state.

11. An electronic device comprising:
a memory; and
a memory manager configured to manage allocation and deallocation of the memory, wherein the memory manager acquires a deallocation unit of the memory based on an optimal number of deallocation operations and in consideration of performance of a corresponding system, and deallocates an allocated memory area based on the acquired deallocation unit,
wherein the memory manager comprises a deallocation unit calculator, and
wherein the deallocation unit calculator is configured to acquire the optimal number of deallocation operations based on measured user waiting times measured for various numbers of deallocation operations.

12. The electronic device of claim 11, wherein the electronic device is a digital camera or a mobile device comprising a digital camera.

13. The electronic device of claim 11, wherein the memory manager allocates a predetermined area of the memory to a process on the electronic device, in response to a play mode for playing data recorded in the electronic device being selected, and deallocates the allocated predetermined area of the memory based on the deallocation unit, in response to a recording mode for recording data in the electronic device being selected.

14. The electronic device of claim 11, wherein the memory manager acquires the optimal number of deallocation operations, based on user waiting times measured for various numbers of deallocation operations for deallocating the allocated memory and which depend upon a CPU performance of the electronic device, and acquires the deallocation unit by dividing a size of the allocated memory area by the optimal number of deallocation operations.

15. A method of managing memory, the method comprising:
determining an optimal number of deallocation operations based on measured user waiting times measured for various numbers of deallocation operations;
acquiring a deallocation unit based on the optimal number of deallocation operations and according to at least one attribute; and
deallocating the allocated memory area using the deallocation unit.

16. The method of claim 15, wherein the at least one attribute includes performance of a system corresponding to the memory.

17. The method of claim 15, wherein the at least one attribute includes a user waiting time incurred upon changing system modes.

18. The method of claim 15, further comprising measuring deallocation times according to various numbers of deallocation units used to deallocate the memory area, in order to acquire the optimal number of deallocation units.

19. The method of claim 15, further comprising measuring various sizes of deallocation units in order to acquire the optimal number of deallocation units.

20. An electronic device comprising:
a memory manager configured to acquire a deallocation unit used to deallocate an allocated memory area based on an optimal number of deallocation operations and according to at least one attribute;
wherein the memory manager is configured to deallocate the allocated memory area using the deallocation unit, and
wherein the memory manager is further configured to acquire the optimal number of deallocation operations based on measured user waiting times measured for various numbers of deallocation operations for deallocating the allocated memory area in accordance to performance of a corresponding system, and is configured to acquire the deallocation unit by dividing a size of the allocated memory area by the optimal number of deallocation operations.

21. The electronic device of claim 20, wherein the at least one attribute includes performance of the electronic device or a system corresponding to the electronic device.

22. The electronic device of claim 20, wherein the at least one attribute includes a user waiting time incurred upon changing modes of the electronic device.

23. The electronic device of claim 20, wherein the memory manager measures deallocation times according to various numbers of deallocation units used to deallocate the memory area, in order to acquire the optimal number of deallocation units.

24. The electronic device of claim 20, wherein the memory manager measures various sizes of deallocation units in order to acquire the optimal number of deallocation units.

* * * * *